Aug. 28, 1951 W. P. FERGNANI 2,566,021
CAGE ROLL STRUCTURE FOR BOXMAKING MACHINERY
Filed Aug. 14, 1950 2 Sheets-Sheet 1
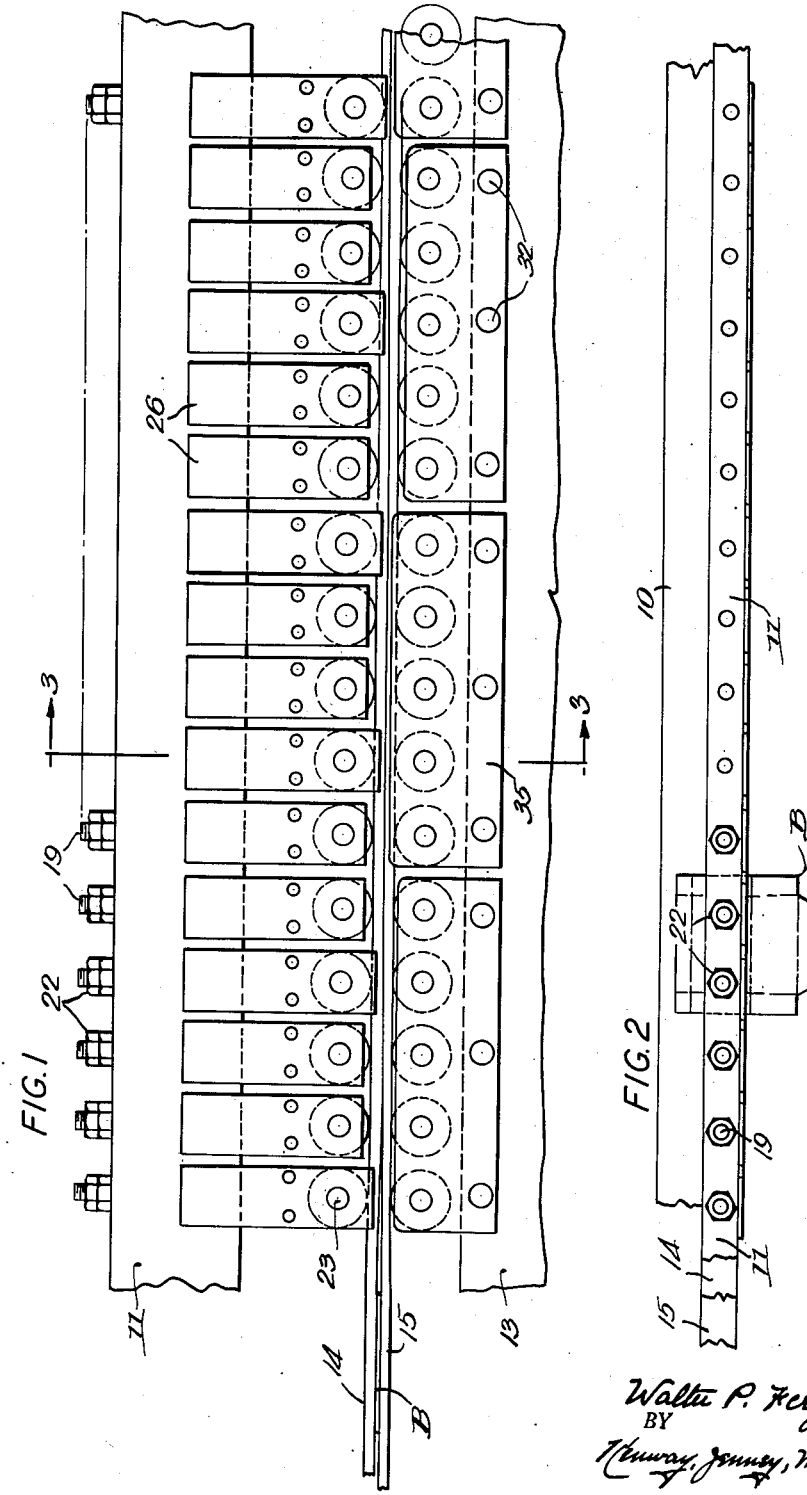
INVENTOR.
Walter P. Fergnani.
BY
Kenway, Jenney, Witter & Hildreth
Attys.

Aug. 28, 1951 W. P. FERGNANI 2,566,021
CAGE ROLL STRUCTURE FOR BOXMAKING MACHINERY
Filed Aug. 14, 1950 2 Sheets-Sheet 2
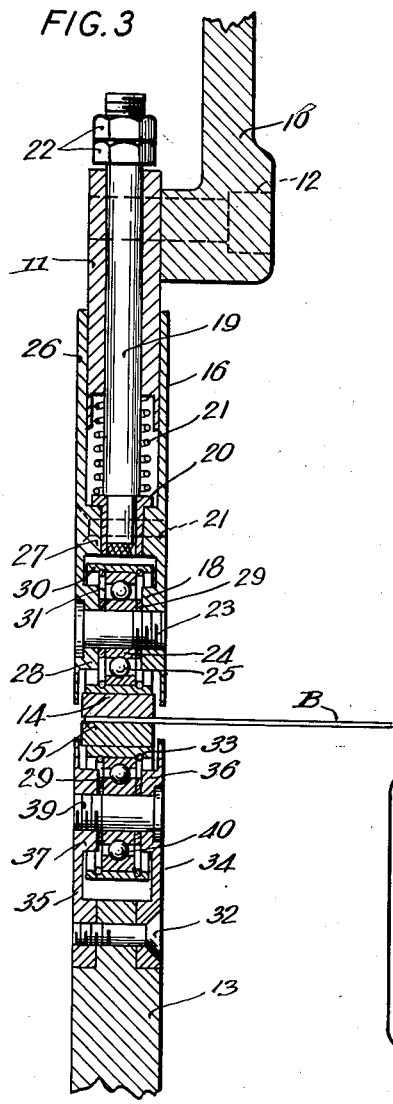
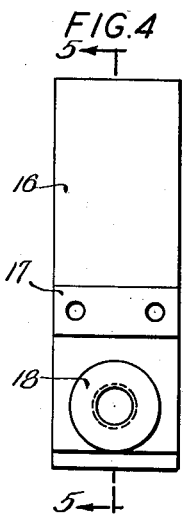
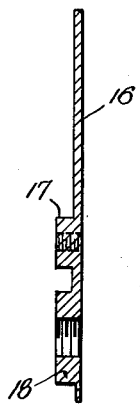
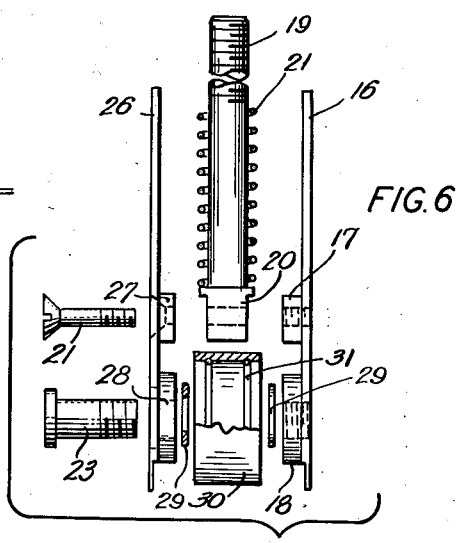
INVENTOR.
Walter P. Fergnani
BY
Kenway, Jenney, Witter & Hildreth
Attys.

UNITED STATES PATENT OFFICE 2,566,021

CAGE ROLL STRUCTURE FOR BOXMAKING MACHINERY

Walter P. Fergnani, Beverly, Mass., assignor to Post Machinery Company, Beverly, Mass., a corporation of Massachusetts Application August 14, 1950, Serial No. 179,159

7 Claims. (Cl. 198—165)

This invention comprises a new and improved cage roll structure for use with conveyor belts in box making machinery or wherever it is desired to support a belt throughout a critical working portion of its path.

In box making machinery conveyor belts are often used to advance box blanks at a high rate of speed to instrumentalities for folding, breaking or gluing various parts of the blanks. Cage rolls are commonly employed to back up the belts and thus insure that each blank will be securely engaged and controlled at all times by the belts. The duty imposed on such cage rolls is very severe and the space available for them in the machine is extremely limited, particularly so in machinery for handling small or narrow boxes where narrow belts are required. Each roll must be individually spring pressed against the belt and be able to withstand the shock of the consecutive box blanks advanced in some cases at a rate of several thousand per minute. Moreover, each roll must be maintained accurately in alignment at all times and in all positions to which it may be displaced by the passage of blanks of different thickness.

The cage roll construction of my invention permits the employment of thin sheet steel side plates by the novel feature of forming in them opposed integral bosses which constitute trunnions or supports for the cage rolls themselves, and pressure receiving areas for the application of spring pressure to the cage roll assembly as a whole. Thus it is entirely practicable to employ side plates of thin sheet steel and to provide ample clearance for the narrowest of these thin plates necessary to permit rectilinear shifting or yielding of the cage roll as it occurs in the normal operation of the machine while positively maintaining the transverse position of the rolls.

Another feature of the invention consists in utilizing the side plates of the cage roll assemblies as edge guides for the feed belt. The side plates thus serve the several functions of mounting the cage rolls, of guiding them in their yielding movement, and of retaining the feed belt in its path.

These and other features of the invention will be best understood and appreciated from the following description of a preferred embodiment thereof, selected for purposes of illustration and shown in the accompanying drawings in which:

Fig. 1 is a view in elevation of that portion of a box folding machine which includes the cage rollers of my invention, Fig. 2 is a corresponding plan view, Fig. 3 is a sectional view on the line 3—3 of Fig. 1 on an enlarged scale, Fig. 4 is a view in elevation of one of the side plates, Fig. 5 is a corresponding sectional view on the line 5—5 of Fig. 4, and Fig. 6 is a view in elevation, partly in section, showing in exploded relation the parts of one cage roll assembly.

The section of the box folding machine shown in Figs. 1 and 2 includes a bracket 10 which is arranged to be laterally adjustable on tie rods supported by the main frames of the machine and which carries a long horizontally disposed supporting bar 11 secured to the bracket by bolts 12, one of which is shown in Fig. 3. A corresponding lower supporting bracket 13 is also arranged to be laterally adjustable on tie rods which are supported by the main frames of the machine and serves to carry the lower cage roll units. The supporting bar 11 and bracket 13 are arranged in parallel longitudinal relation, one above the other, and between them run the conveyor belts 14 and 15 by which the box blanks B are engaged and advanced to the various instrumentalities of the machine. The function of the cage rolls, as already explained, is to support the conveyor belts 14 and 15, subject them to sufficient pressure to insure that the box blanks are firmly engaged and advanced without danger of twisting or misplacement, and to determine vertically the path of the belts.

Each of the upper cage roll units includes a pair of similar side plates 16 and 26 of thin sheet steel. The side plates are similar in their construction except that the bosses of one are countersunk and those of the other are threaded. As shown in Figs. 4 and 5, the side plate 16 has formed as an integral part thereof a rectangular boss 17 and a circular boss 18. The circular boss is located adjacent to the lower edge of the plate and the rectangular boss is spaced somewhat above it. The bosses 17 and 18 of the side plate 16 are both threaded. The corresponding side plate 26 forms the exact counterpart of the side plate 16 except that it is countersunk in its outer surface opposite to its two bosses 27 and 28.

Each unit is mounted upon the supporting bar 11 by a spindle 19 carrying at its lower end and welded to it a rectangular block 20 shaped to fit between the rectangular bosses 17 and 27 and flanged at its upper edge to overlie these bosses. A compression spring 21 surrounds the spindle 19 and bears upon the upper face of the block 20. At its upper end it engages the lower face of the supporting bar 11 and is completely enclosed in the chamber provided by the side plates 16 and 26. The spindle 19 passes upwardly through a vertical bore in the supporting bar 11 and is provided at its upper end with lock nuts 22 which limit the downward movement of the unit but permit it to yield upwardly against the compression of the spring 21.

The circular bosses 18 and 28 receive a threaded stud 23 upon which is supported the inner race 24 of ball bearings 25. The outer race is pressed into a roll 30 and the bearings are held in place within the roll by circular spring wires 31. The two bosses 18 and 28 furnish sufficient material for adequately supporting the stud 23, and the boss 18 contains sufficient threads to retain the stud permanently in place and eliminate looseness and wear upon the threads. The head of the stud lies flush with the outer face of the side plate 26. The two side plates 16 and 26 are free to slide up and down in contact with the opposite faces of the interposed supporting bar 11, thus positively eliminating any tendency of the unit to twist.

Spacers in the form of washers 29 are provided to fill in the space between the face of the bearing and the bosses 18 and 28 of the side plates so that when the screws 23 and 39 are tightened, the inner race of the bearing will be clamped firmly in position.

By reference to Fig. 1 it will be seen that the side plates 16 and 26 of each third unit of the series are longer than the side plates of intermediate units. The short side plates terminate substantially above the upper conveyor belt 14, while the longer side plates extend below the bearing surface of the rolls 30 and serve as edge guides for the belt 14. By this arrangement excessive edge friction is avoided and yet the path of the feed belt is positively and adequately controlled.

The conveyor belt 15 is supported from beneath by a series of cage roll units which are secured rigidly to the lower supporting bracket 13 by screws 32. Each of these units includes five rolls 33 mounted between side plates 34 and 35 provided with integral circular bosses 36 and 37 similar to the bosses 18 and 28 already described. A threaded stud 39 is held in these bosses and each pair of bosses supports ball bearings 40 for a roll 33. The side plates 34 and 35 also have integral rectangular bosses at their lower ends which fit upon the shouldered upper edge of the lower supporting bracket 13 and receive the screws 32.

As in the case of the upper cage units, the side plates 34 and 35 of the lower cage units are made selectively long and short so that the side plates 35 of one unit act as edge gauges for the lower belt 15 while the side plates of the next two units are short enough entirely to clear the belt.

From the following description it will be clear that my invention results in an exceptionally rigid construction and that the over-all width of the two side plates is limited to a dimension only slightly less than the width of the conveyor belt. It will be noted also that in this construction the pressure exerted by the spring 21 is transmitted to the rectangular block 20, then through the side plates 26 and 16, and eventually to the stud 23 which carries the ball bearing and the cage roll 30. Accordingly, the small screws 21 do not carry any of the load as their only function is to hold the rectangular block 20 in its proper location. The same advantage is found in the lower structure where the screws 32 do not carry any of the load exerted downwardly by the springs 21.

Having thus disclosed my invention and described in detail an illustrative embodiment thereof, I claim as new and desire to secure by Letters Patent:

1. An improved cage roll structure for box making machinery having a conveyor belt and a supporting bar, comprising a pair of rectangular complementary side plates having opposed circular bosses near their lower ends and opposed rectilinear bosses at an intermediate point, a ball bearing roll mounted upon said circular bosses, a spindle having at its lower end a flanged block which is interposed between the rectilinear bosses and bears upon their upper edges, a spring encircling the spindle while the side plates slidingly engage the supporting bar, and screws passing through the side plates and rectilinear bosses holding the plates together.

2. An improved cage roll structure for box making machinery, comprising complementary side plates having opposed rectangular and circular bosses, a ball bearing roll shaped to enclose and clear the said circular bosses, and a spindle having a block at its lower end which is clamped between said rectangular bosses.

3. Cage roll structure as defined in claim 2 in which the boss of one side plate is threaded and receives a threaded stud inserted through the roll and the boss of the other side plate.

4. An improved cage roll unit for box making machinery, comprising a pair of separate thin steel side plates having opposed integral bosses of circular contour, a ball bearing roll shaped to enclose said bosses with clearance, a stud held in said bosses and holding them in position rotatably to support the ball bearing roll, and yielding means disposed between the side plates for supporting the unit in operative position.

5. An improved cage roll unit for box making machinery, comprising a pair of thin steel side plates having opposed integral bosses at an intermediate point, a roll journaled between the plates near one end thereof, a block clamped between the said bosses and overlying one face thereof, a spindle projecting from the block midway between the side plates, and a compression spring encircling the spindle above the block and housed between the side plates.

6. In a box folding machine having a conveyor belt; a supporting bar extending parallel to the conveyor belt, and a series of cage roll units each comprising thin opposed side plates engaging the side faces of the bar and a roll journaled between the side plates in rolling contact with the belt, the side plates of certain units being short on one side and clearing the belt, and being long on the other side, engaging the edge of the belt and acting as a guide therefor.

7. In a box folding machine having a conveyor belt; a cage roll unit comprising a pair of separate sheet steel side plates having integral opposed bosses, a ball bearing having one of its races clamped between the bosses and spacing the plates apart a distance approximating the width of the conveyor belt, a roll mounted on said bearing, screws passing through said bosses and holding the plates in assembled position, and spring means located between the plates for supporting the unit as a whole in a yielding manner.

WALTER P. FERGNANI.

REFERENCES CITED

The following references are of record in the file of this patent:

UNITED STATES PATENTS

| Number | Name | Date |
|---|---|---|
| 2,253,824 | Townsend et al. | Aug. 26, 1941 |
| 2,508,216 | Bonds et al. | May 16, 1950 |